(12) United States Patent
Arata et al.

(10) Patent No.: US 10,165,262 B2
(45) Date of Patent: Dec. 25, 2018

(54) IMAGE PROCESSING DEVICE AND MARKERS

(71) Applicant: Panasonic Intellectual Property Management Co., Ltd., Osaka (JP)

(72) Inventors: Koji Arata, Kanagawa (JP); Wataru Nakai, Tokyo (JP); Yuko Arai, Tokyo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 377 days.

(21) Appl. No.: 14/911,002

(22) PCT Filed: May 19, 2014

(86) PCT No.: PCT/JP2014/002623
§ 371 (c)(1),
(2) Date: Feb. 8, 2016

(87) PCT Pub. No.: WO2015/019526
PCT Pub. Date: Feb. 12, 2015

(65) Prior Publication Data
US 2016/0203606 A1 Jul. 14, 2016

(30) Foreign Application Priority Data
Aug. 8, 2013 (JP) .................. 2013-164965

(51) Int. Cl.
*G06T 7/246* (2017.01)
*G06K 9/32* (2006.01)
(Continued)

(52) U.S. Cl.
CPC ............ *H04N 17/002* (2013.01); *B60R 1/00* (2013.01); *G06T 7/13* (2017.01); *G06T 7/80* (2017.01);
(Continued)

(58) Field of Classification Search
CPC ........ H04N 7/18; H04N 17/002; H04N 5/225; G06K 9/00; G06T 7/13; G06T 7/80; B60R 1/00
See application file for complete search history.

(56) References Cited

U.S. PATENT DOCUMENTS

| | | | |
|---|---|---|---|
| 2008/0031514 A1 | 2/2008 | Kakinami | |
| 2010/0014750 A1* | 1/2010 | Seko | G06K 9/3216 |
| | | | 382/154 |

(Continued)

FOREIGN PATENT DOCUMENTS

| | | |
|---|---|---|
| EP | 2 233 357 A2 | 9/2010 |
| JP | 2006-148745 A | 6/2006 |

(Continued)

OTHER PUBLICATIONS

International Search Report Issued in Application No. PCT/JP2014/002623 dated Aug. 5, 2014.

(Continued)

*Primary Examiner* — Jeffery A Williams
*Assistant Examiner* — Patricia I Young
(74) *Attorney, Agent, or Firm* — Pearne & Gordon LLP

(57) ABSTRACT

An image processing device (10) comprises the following: an image acquisition unit (1) for acquiring an image in which markers for calibration are captured; an edge detection unit (2) for detecting the edges of the markers in the image; a polygon generating unit (3) for estimating a plurality of straight lines on the basis of the edges and generating a virtual polygon region that is surrounded by the plurality of straight lines, the generation being carried out in the image in a region thereof including regions other than those where markers are installed; and a camera parameter calculation unit (4) for calculating camera parameters on the basis of the characteristic amount, with respect to the image, (Continued)

of the virtual polygon region and the characteristic amount, with respect to real space, of the virtual polygon region.

6 Claims, 21 Drawing Sheets

(51) Int. Cl.
| | | |
|---|---|---|
| *G06T 7/73* | (2017.01) | |
| *G06K 9/52* | (2006.01) | |
| *G06K 9/62* | (2006.01) | |
| *H04N 17/00* | (2006.01) | |
| *B60R 1/00* | (2006.01) | |
| *G06T 7/80* | (2017.01) | |
| *G06T 7/13* | (2017.01) | |

(52) U.S. Cl.
CPC ... *B60R 2300/402* (2013.01); *B60R 2300/607* (2013.01); *G06T 2207/10004* (2013.01); *G06T 2207/30204* (2013.01); *G06T 2207/30252* (2013.01); *G06T 2207/30256* (2013.01)

(56) References Cited

U.S. PATENT DOCUMENTS

| | | |
|---|---|---|
| 2010/0231717 A1 | 9/2010 | Sasaki et al. |
| 2010/0245575 A1 | 9/2010 | Mori et al. |
| 2011/0216194 A1 | 9/2011 | Kosaki |
| 2011/0238252 A1 | 9/2011 | Takeda |

FOREIGN PATENT DOCUMENTS

| | | |
|---|---|---|
| JP | M06-349443 A | 12/2006 |
| JP | 2010-244326 A | 10/2010 |
| JP | 2011-047725 A | 3/2011 |
| JP | 2011-155687 A | 8/2011 |
| JP | 2011-182236 A | 9/2011 |
| JP | 2011-221983 A | 11/2011 |

OTHER PUBLICATIONS

Extended European Search Report for Application No. 14834074.8 dated Jun. 23, 2016.

* cited by examiner

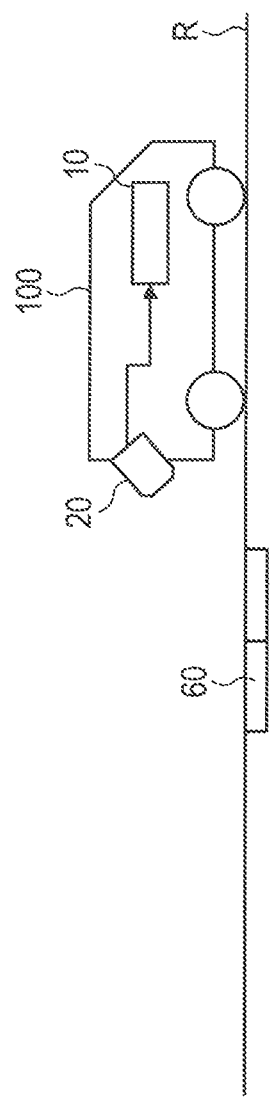
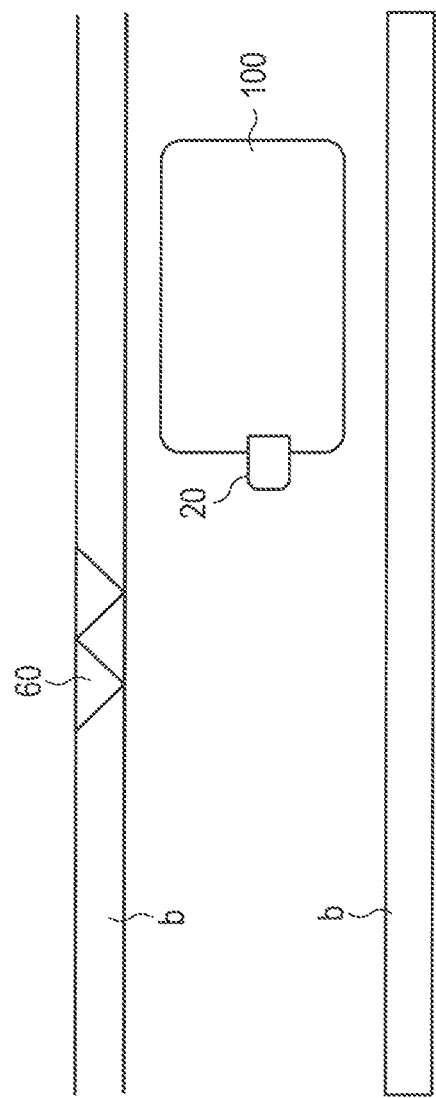

| EVALUATION VALUE | ROLL ANGLE [degree] | PITCH ANGLE [degree] |
|---|---|---|
| 7.24 | 2 | 78 |
| : | : | : |
| : | : | : |
| 1.13 | 8 | 80 |
| 0.96 | 10 | 80 |
| 1.35 | 12 | 80 |
| : | : | : |
| : | : | : |
| 12.46 | 18 | 82 |

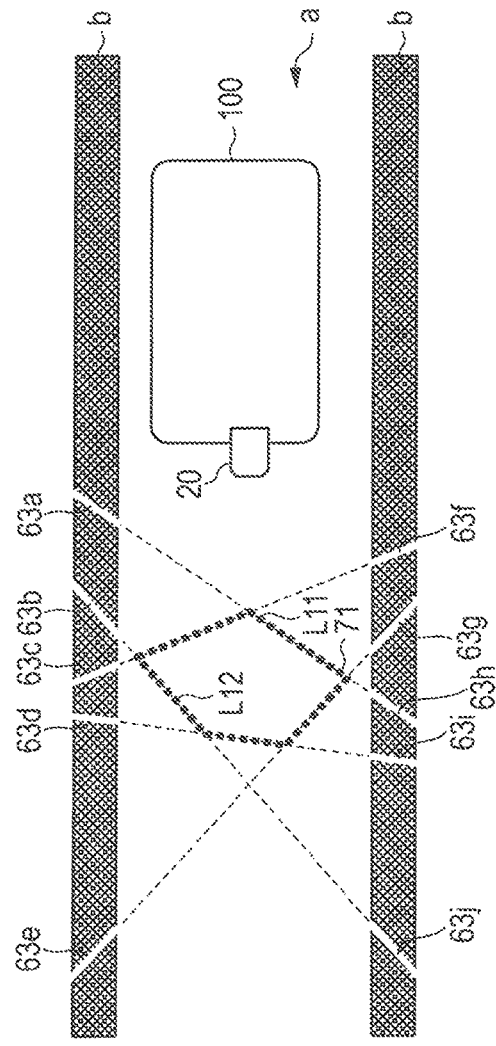
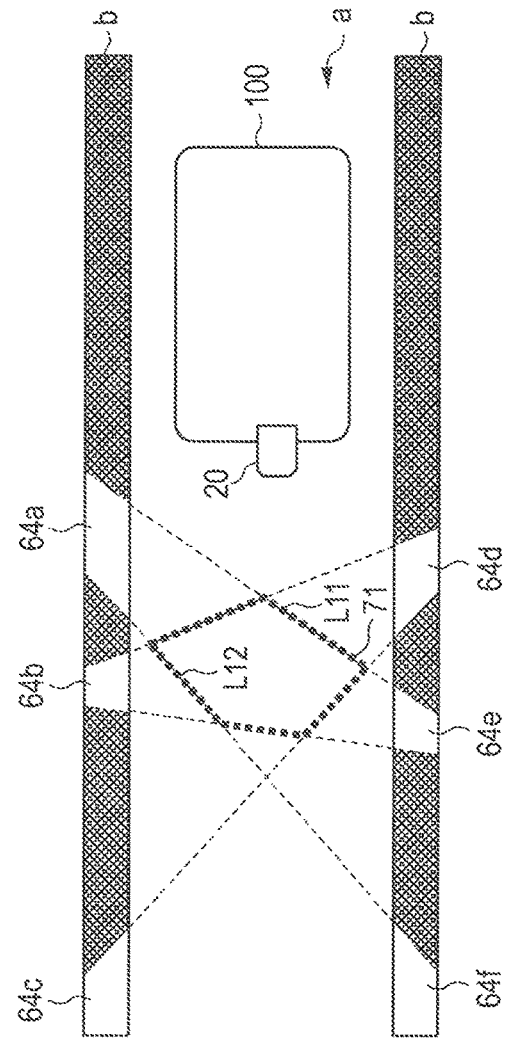
FIG. 19A
FIG. 19B

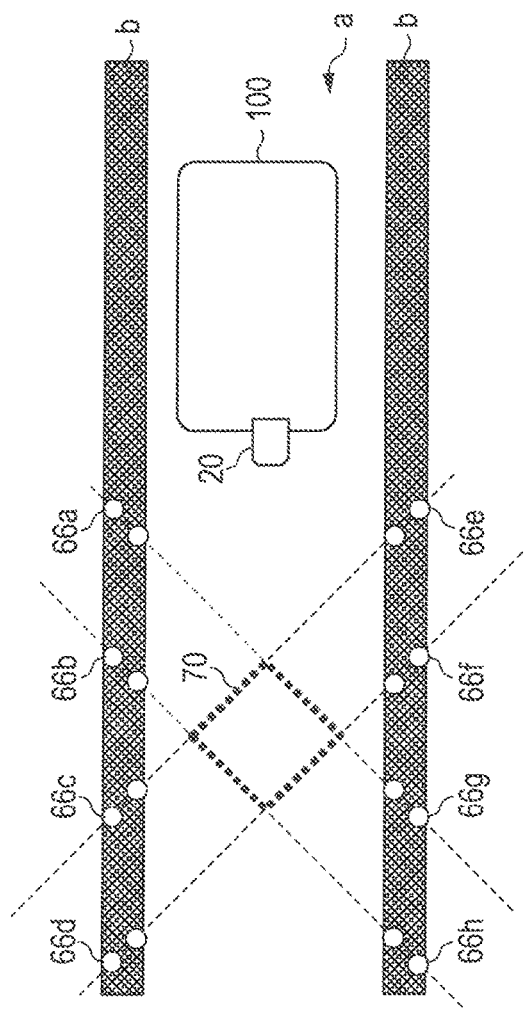
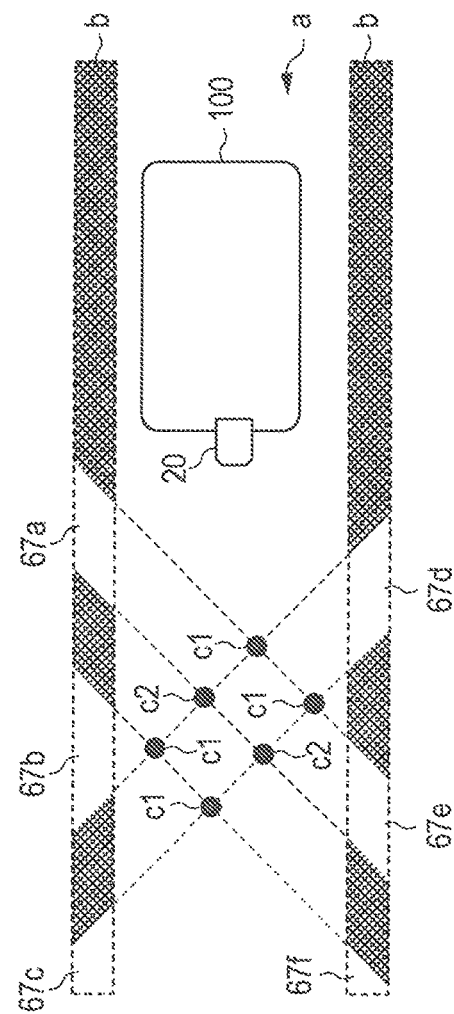
FIG. 21A
FIG. 21B

IMAGE PROCESSING DEVICE AND MARKERS

TECHNICAL FIELD

The present invention relates to an image processing apparatus and a marker for calculating a camera parameter.

BACKGROUND ART

Camera systems using vehicle-mounted cameras in recent years include a function of displaying a guide line indicating an estimated location of a vehicle and superimposed on an image taken by a camera (hereinafter referred to as "camera image") or a function of generating an image from a virtual viewpoint through geometric conversion of the camera image or the like. Both of these functions use association between a three-dimensional position in a real space and a two-dimensional position projected on the camera image. Implementing such association requires calculations (hereinafter referred to as "calibration," as appropriate) of so-called camera parameters such as a setting angle or setting position of the camera or projective transformation parameters.

Calibration based on a camera image normally uses a calibration marker whose shape, size, and setting position or the like are known. As one such mode, there is a method that takes an image of a marker including a specific pattern set on a road surface and uses a projection position with respect to the camera image (e.g., see Patent Literature (hereinafter abbreviated as "PTL") 1).

Moreover, as an example of a method using a marker having a polygonal shape, a method is known which takes an image of a square marker set on a road surface using a camera, projectively transforms the camera image, generates a bird's eye image and calculates a projective transformation parameter, which is an example of a camera parameter, based on the square shape and existing position in the bird's eye image (e.g., see PTL 2).

CITATION LIST

Patent Literature

PTL 1
Japanese Patent Application Laid-Open No. 2011-047725
PTL 2
Japanese Patent Application Laid-Open No. 2010-244326

SUMMARY OF INVENTION

Technical Problem

The techniques disclosed in PTLs 1 and 2 require a maker to be set on a road surface, but the range in which the marker can be set may be restricted. An example of this case will be described using FIG. 1.

FIG. 1 is a figure illustrating an example where a vehicle and a road surface are seen from above. In FIG. 1, since region a is a region through which vehicles pass, no marker can be set. Meanwhile, region c is a region located at more than a predetermined distance from one side of the vehicle, so that no marker can be set. In contrast, region b is a region located at less than a predetermined distance from one side of the vehicle, so that a marker can be set.

When the range in which a marker can be set is restricted in this way, a marker having necessary size for calibration cannot be set at an appropriate position, which results in a problem that calibration accuracy may deteriorate.

An object of the present invention is to provide an image processing apparatus and a marker capable of keeping the accuracy for calibration even when a range in which a calibration marker can be set is restricted.

Solution to Problem

An image processing apparatus according to an aspect of the present invention includes: an image acquiring section that acquires a captured image of a calibration marker; an edge detection section that detects an edge or a feature point of the marker in the image; a polygon generation section that estimates a plurality of straight lines based on the edge or feature point and generates a virtual polygon region surrounded by the plurality of straight lines and including a region other than a region of the image in which the marker is set; and a camera parameter calculation section that calculates a camera parameter based on a feature value of the virtual polygon region in the image and a feature value of the virtual polygon region in a real space.

A marker according to an aspect of the present invention is a marker used for calibration, in which an edge or a feature point of the marker in a captured image of the marker is detected; a plurality of straight lines are estimated based on the edge or the feature point; and a virtual polygon surrounded by the plurality of straight lines is generated to be a region of the image including a region other than a region in which the marker is set.

Advantageous Effects of Invention

According to the present invention, it is possible to keep the accuracy of calibration even when a range in which a calibration marker can be set is restricted.

BRIEF DESCRIPTION OF DRAWINGS

FIGS. 2A and 2B are figures each illustrating a calibration environment of an image processing apparatus according to Embodiment 1 of the present invention;

FIGS. 15A and 5B are figures illustrating an example of comparison between a marker setup according to the related art and a marker setup according to Embodiment 2 of the present invention;

FIGS. 19A and 19B are figures illustrating other examples of markers and a virtual polygon according to each embodiment of the present invention;

FIGS. 21A and 21B are figures illustrating still other examples of markers and a virtual polygon according to each embodiment of the present invention.

DESCRIPTION OF EMBODIMENTS

Hereinafter, embodiments of the present invention will be described with reference to the accompanying drawings.

Embodiment 1

First, Embodiment 1 will be described.

FIGS. 2A and 2B are figures illustrating a calibration environment according to the present embodiment. FIG. 2A is a side view of a vehicle located on a road surface and a marker set on the road surface. FIG. 2B is a top view of the vehicle and the marker shown in FIG. 2A.

As shown in FIG. 2A, vehicle 100 is equipped with camera 20 at its rear and includes therein image processing apparatus 10 (an example of an image processing apparatus according to the present invention). Camera 20 takes an image of marker 60 set on road surface R. This camera image is inputted to image processing apparatus 10 and used for calibration.

As shown in FIG. 2B, marker 60 is set on one side of range (hereinafter referred to as "marker settable range") b in which a marker can be set. In FIG. 2B, marker 60 has a shape including, for example, two isosceles right triangles arranged side by side.

Figure 1:
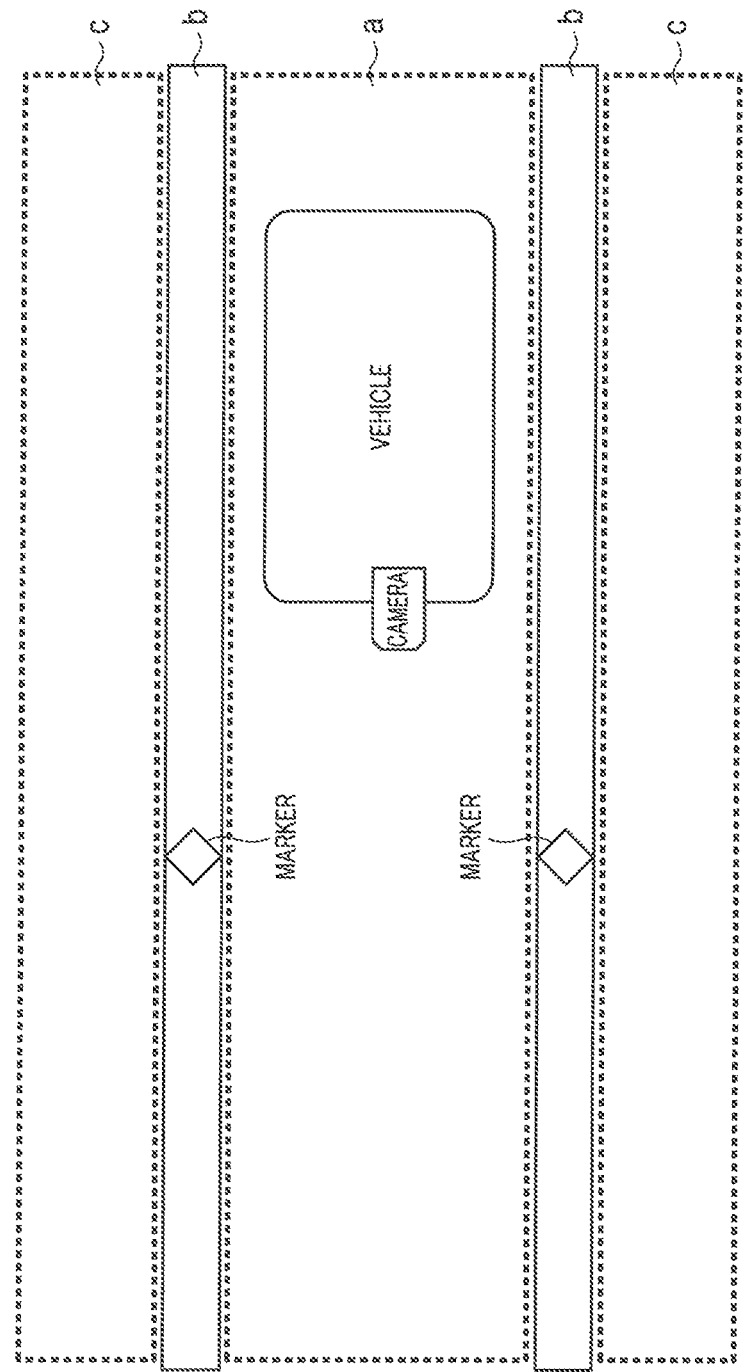
FIG. 1 is a figure illustrating an example of a range in which typical markers can be set.
Figure 3:
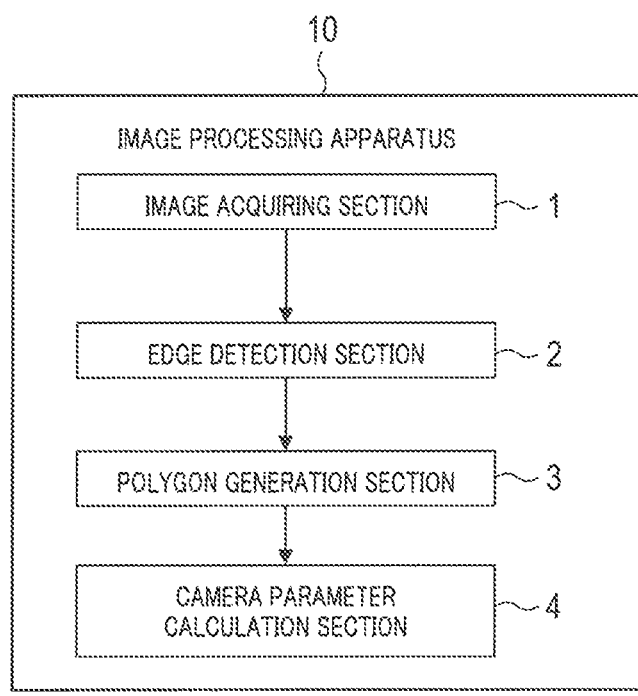
FIG. 3 is a block diagram illustrating a configuration example of the image processing apparatus according to Embodiment 1 of the present invention.

FIG. 3 is a block diagram illustrating a configuration example of image processing apparatus 10 according to the present embodiment.

In FIG. 3, image processing apparatus 10 includes image acquiring section 1, edge detection section 2, polygon generation section 3 and camera parameter calculation section 4.

Image acquiring section 1 acquires a camera image taken by camera 20. This camera image is a captured image of marker 60.

Edge detection section 2 applies image processing to the camera image acquired by image acquiring section 1 and detects a plurality of edges of marker 60 from the camera image.

Polygon generation section 3 estimates a plurality of straight lines based on the plurality of edges detected by edge detection section 2. For example, polygon generation section 3 estimates straight lines that pass through a group of more points making up an edge using, for example, Hough transform or least squares method which are publicly known schemes. In the camera image, polygon generation section 3 generates a virtual polygon region surrounded by those straight lines in a region including a region outside a marker settable range (region including both the marker settable range and range outside the marker settable range or only region outside the marker settable range).

Camera parameter calculation section 4 calculates a camera parameter based on a feature value in the image of the virtual polygon region generated in polygon generation section 3 and a feature value in a real space of the virtual polygon region. Examples of the calculated camera parameters include a roll angle, pitch angle, and height as to camera 20 set in vehicle 100.

The above-described "feature value in the image of the polygon region" is information on the shape of a polygon in the image, and corresponds to a length of each side of the polygon in the image when the length of the side is used to calculate the roll angle or pitch angle. For example, when the virtual polygon region is a pentagon and the vertexes thereof are assumed to be A, B, C, D and E, the feature values are the lengths of sides AB, BC, CD, DE and EA in the image. Note that the length of each side is calculated based on coordinate values of vertexes A to E specified by vertex specification section 32 which will be described later.

The above-described "feature value in the real space of the polygon region" refers to information on the actual shape of the polygon, and corresponds to the actual length of each side of the polygon when, for example, the length of the side is used to calculate the roll angle or pitch angle. For example, the virtual polygon region is a pentagon and when the vertexes thereof are assumed to be A, B, C, D and E, the feature values are the actual lengths of sides AB, BC, CD, DE and EA. Alternatively, for example, when the virtual polygon region is a square, the feature value is the fact that the side lengths are the same, and the actual length of one side.

For example, the following two methods are available as the above-described "calculation of camera parameters." One of the methods is a method that uniquely calculates a camera parameter using linear simultaneous equations or a nonlinear one-to-one correspondence table from a geometric relationship based on feature values in an image and feature values in a real space. The other is a method that obtains an evaluation value indicating the degree of matching between the shape of the polygon in the image and the shape of the polygon in the real space from the feature values in the image and feature values in the real space and calculates a camera parameter through optimization based on the evaluation value. For example, calculations of the roll angle and pitch angle correspond to the latter method, and the method calculates an evaluation value from the ratio in length between the respective sides of the polygon in the real space and the ratio in length between the respective sides of the polygon in the corresponding image and obtains a combination of roll angle and pitch angle at which the evaluation value becomes a minimum.

As described above, image processing apparatus 10 of the present embodiment generates a virtual polygon region in a region outside a marker settable range based on marker edges detected from a captured image of a calibration marker and calculates a camera parameter based on the polygon region. With this feature, image processing apparatus 10 can keep the accuracy of calibration even when the marker settable range is restricted.

Embodiment 2

Next, Embodiment 2 will be described.

The calibration environment in the present embodiment is similar to the calibration environment according to Embodiment 1 shown in FIG. 2.

Figure 4:
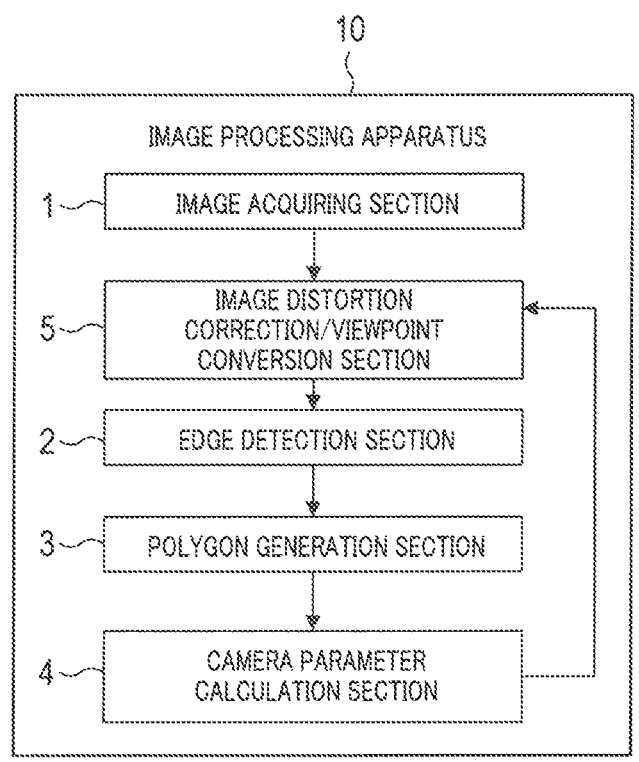
FIG. 4 is a block diagram illustrating a configuration example of an image processing apparatus according to Embodiment 2 of the present invention.

FIG. 4 is a block diagram illustrating a configuration example of image processing apparatus 10 according to the present embodiment.

In FIG. 4, image processing apparatus 10 includes image acquiring section 1, edge detection section 2, polygon generation section 3, camera parameter calculation section 4, and image distortion correction/viewpoint conversion section 5.

Image acquiring section 1 acquires a camera image taken by camera 20. This camera image is a captured image of marker 60.

Image distortion correction/viewpoint conversion section 5 corrects distortion included in a camera image acquired by image acquiring section 1, converts the camera image into a state of central projection and converts the image as its road surface R into a viewpoint seen from above in the sky like a bird's eye view using a preset external parameter (also referred to as "extrinsic parameter," an example of a camera parameter). Note that the extrinsic parameter used here is one of an initial temporary parameter set from the beginning in image distortion correction/viewpoint conversion section 5, a temporary parameter set by temporary parameter setting section 44, which will be described later, and a parameter specified by angle specification section 45, which will be described later. For example, a design value of the camera setting angle corresponding to the vehicle is set as an initial temporary parameter.

Figure 5A:
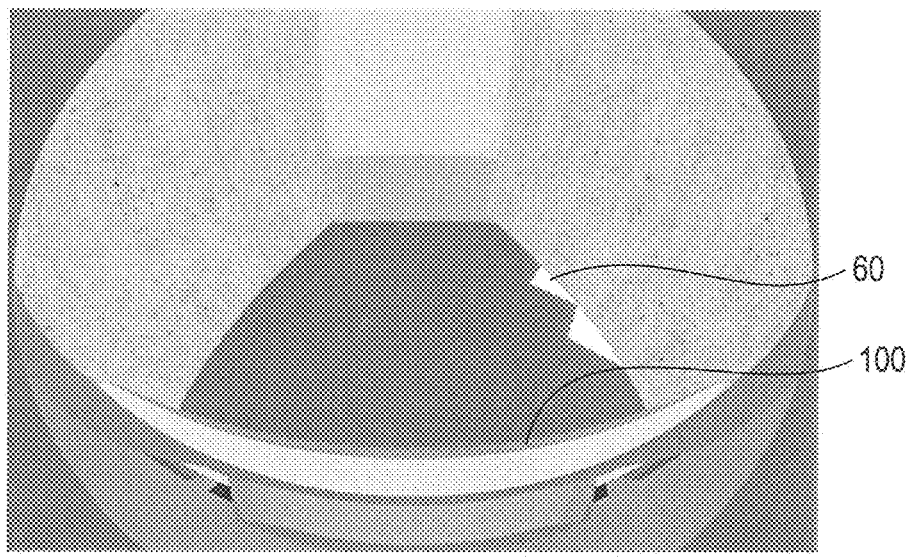
FIGS. 5A and 5B are figures illustrating examples of images before and after distortion correction/viewpoint conversion according to Embodiment 2 of the present invention.
Figure 5B:
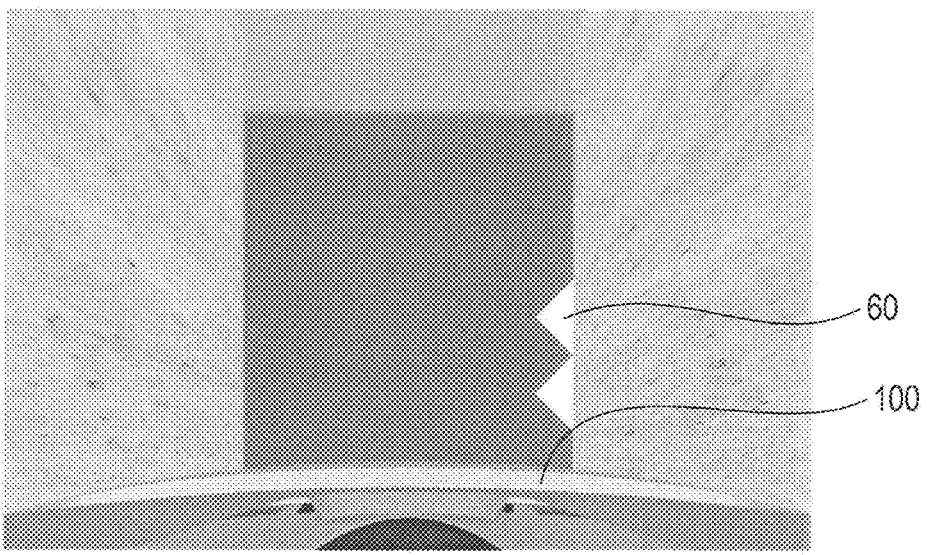

FIGS. 5A and 5B show examples of an image before and after distortion correction and viewpoint conversion. Image distortion correction/viewpoint conversion section 5 performs distortion correction and viewpoint conversion on the camera image shown in FIG. 5A to thereby generate an image shown in FIG. 5B.

Here, the aforementioned distortion correction and association of coordinates in the viewpoint conversion will be described.

First, coordinates of an image before distortion correction and coordinates of an image after distortion correction are associated with each other via internal parameters (also referred to as "intrinsic parameters," example of camera parameters) made up of optical axis center coordinates, focal length and lens distortion coefficient or the like. The intrinsic parameters are stored in image distortion correction/viewpoint conversion section 5 as fixed values calculated beforehand. The intrinsic parameter calculation method may be a publicly known method. One such publicly known method is a method that takes an image of a checkerboard whose square size is known, detects intersection positions of the pattern of the checkerboard from the captured image, optimizes the pattern so that the intersection points are arranged at equal intervals as much as possible, and thereby calculates intrinsic parameters. Note that when the camera lens is a fish-eye lens, intrinsic parameters relating to projective transformation corresponding to the fish-eye lens such as so-called equidistant projection or stereographic projection may be calculated.

Next, coordinates of an image before viewpoint conversion and coordinates of an image after viewpoint conversion are associated with each other via extrinsic parameters of the camera made up of a camera setting angle with respect to the road surface and a setting position. The camera setting angle is expressed by a roll angle, pitch angle and yaw angle, and the camera setting position is expressed by X coordinate, Y coordinate and Z coordinate. In a three-dimensional coordinate system with reference to the road surface and the traveling direction of the vehicle, for example, the Y coordinate is defined as a direction perpendicular to the road surface, the Z coordinate is defined as a direction along the traveling direction of the vehicle and the X coordinate is defined as a direction perpendicular to the Y coordinate and Z coordinate.

To obtain coordinates after distortion correction and viewpoint conversion, processing of distortion correction and viewpoint conversion is performed in order on the coordinates. To obtain an image after distortion correction and viewpoint conversion, image conversion is performed using, for example, a lookup table. This lookup table is obtained by performing inverse conversion of viewpoint conversion and inverse conversion of distortion correction in order using the coordinates after distortion correction and viewpoint conversion as a starting point, obtaining the corresponding coordinates and describing the correspondence thereof.

Returning to FIG. 4, edge detection section 2 will be described.

Edge detection section 2 applies image processing to the image generated in image distortion correction/viewpoint conversion section 5, and thereby detects edges of marker 60.

Figure 6:
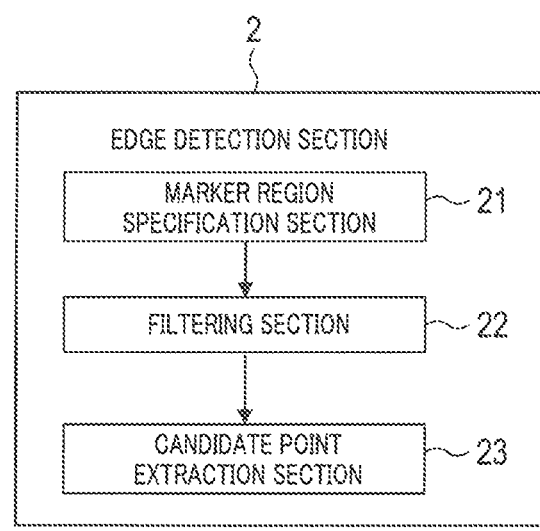
FIG. 6 is a block diagram illustrating a configuration example of an edge detection section according to Embodiment 2 of the present invention.

As shown in FIG. 6, edge detection section 2 includes marker region specification section 21, filtering section 22 and candidate point extraction section 23.

Figure 7A:
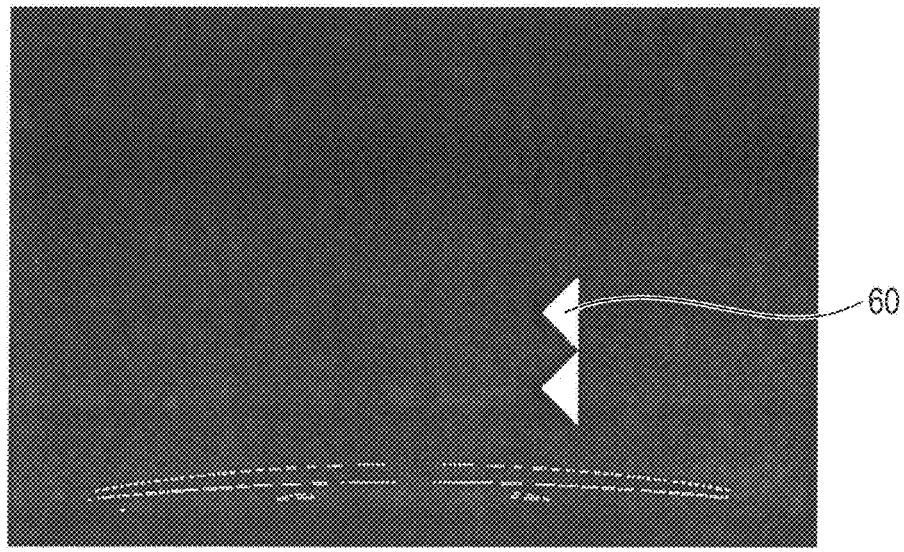
FIGS. 7A and 7B are figures illustrating an image after marker region specification and an image after filtering according to Embodiment 2 of the present invention.

Marker region specification section 21 specifies the region of marker 60 (hereinafter referred to as "marker region") from the image (e.g., the image in FIG. 5B) generated in image distortion correction/viewpoint conversion section 5. An example of the image after marker region specification is shown in FIG. 7A. As shown in FIG. 7A, the region of marker 60 is specified.

Examples of available marker region specification methods include a method using luminance information and a method detecting feature points. The method using luminance information detects markers using a difference between the luminance of the road surface and the luminance of the markers. For example, when the luminance of the road surface in the calibration environment is low, a marker region is specified by setting markers having high luminance on the road surface, taking images of the markers using a camera and then detecting a portion whose luminance is equal to or greater than a fixed value from the camera image. On the other hand, the method detecting the feature point uses, for example, common Harris' corner detection technique, and thereby detects a plurality of marker end points based on the amount of variation in luminance in the camera image.

Figure 7B:
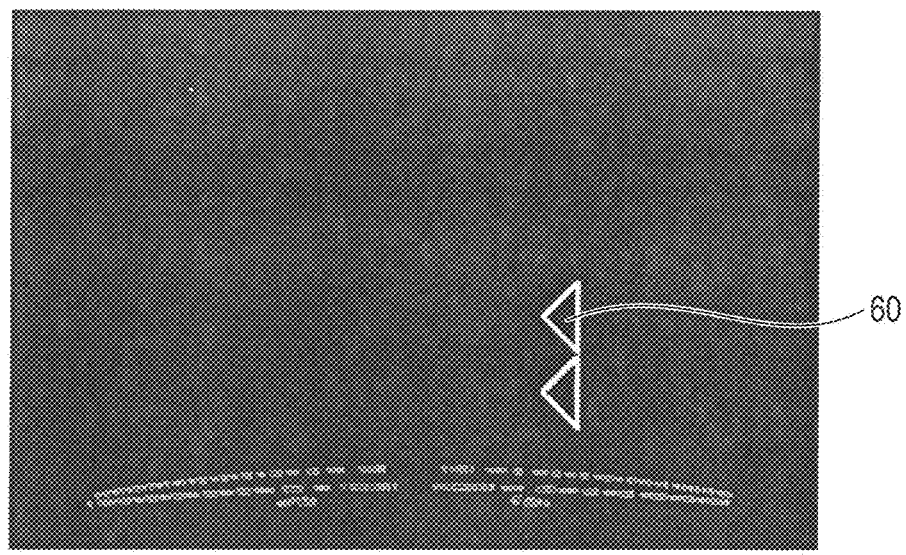

Filtering section 22 performs filtering on the image after marker region specification (e.g., the image in FIG. 7A) using a specific operator (e.g., laplacian operator). FIG. 7B shows an example of the image after the filtering. As shown in FIG. 7B, an outer circumference of marker 60 is specified.

Figure 8E:
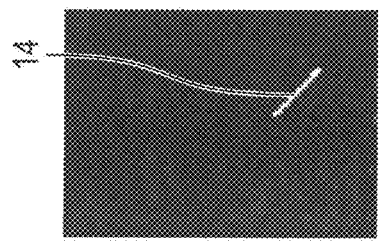
FIGS. 8A to 8E are figures illustrating examples of images before and after extraction of a candidate point according to Embodiment 2 of the present invention.
Figure 8D:
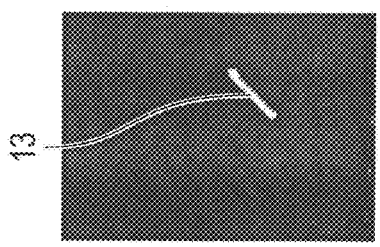
Figure 8C:
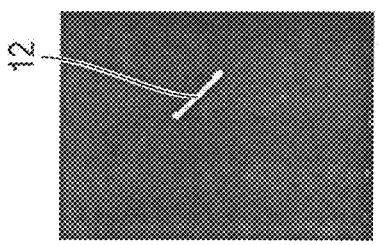
Figure 8B:
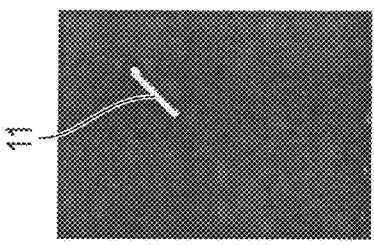
Figure 8A:
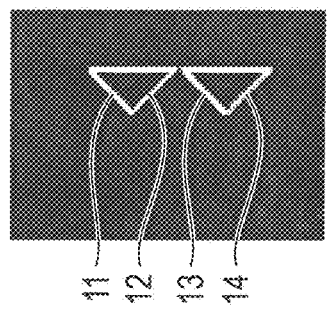

Candidate point extraction section 23 searches for a variation in luminance from a fixed direction in the image after the filtering (e.g., the image in FIG. 7B), and thereby specifies edges from a set of candidate points. For example, as shown in FIG. 8A, candidate point extraction section 23 specifies edges 11 to 14 on the outer circumference of marker 60. In the example in FIG. 8A, the oblique sides of two triangles making up marker 60 are specified as edges 11 to 14, respectively. FIG. 8B is an image illustrating edge 11. FIG. 8C is an image illustrating edge 12. FIG. 8D is an image illustrating edge 13. FIG. 8E is an image illustrating edge 14.

Returning to FIG. 4, polygon generation section 3 will be described.

Polygon generation section 3 estimates a plurality of straight lines based on the plurality of edges detected in edge detection section 2. Polygon generation section 3 then generates a virtual polygon region surrounded by a plurality of straight lines estimated from the camera image. This virtual polygon region is generated in a region including a region outside the marker settable range, that is, a region including both the marker settable range and a region outside the marker settable range or only a region outside the marker settable range.

Figure 9:
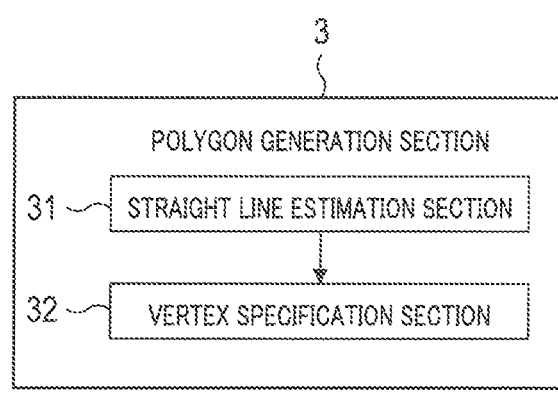
FIG. 9 is a block diagram illustrating a configuration example of a polygon generation section according to Embodiment 2 of the present invention.

Polygon generation section 3 includes straight line estimation section 31 and vertex specification section 32 as shown in FIG. 9.

Figure 10:
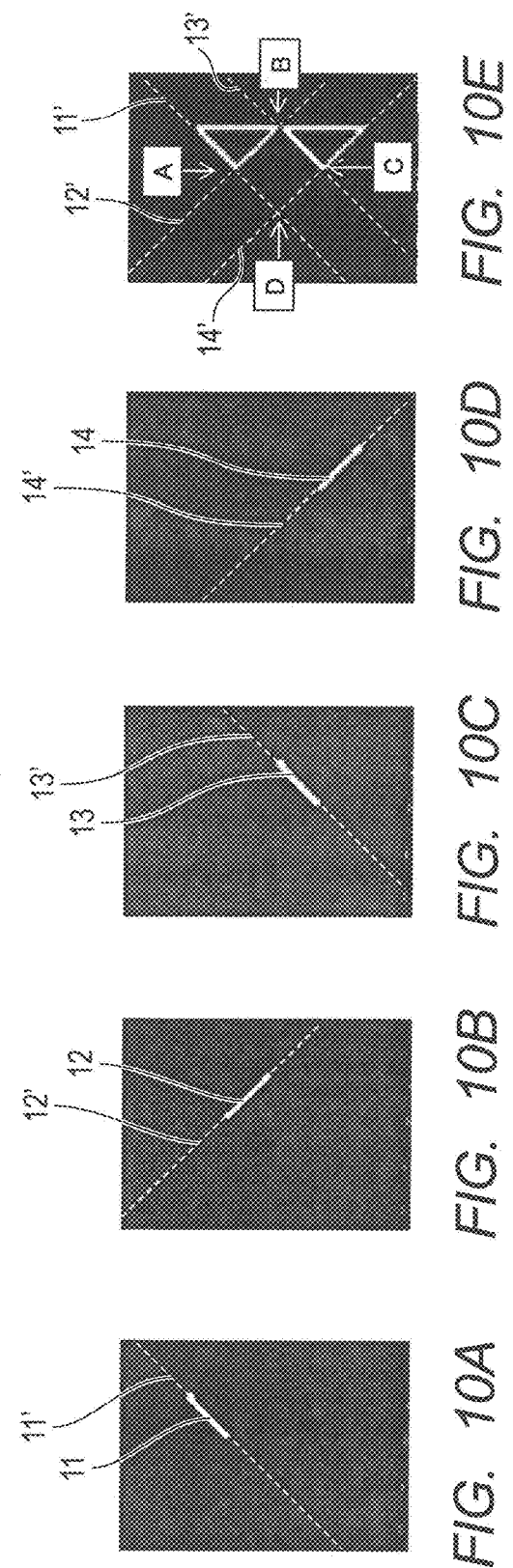
FIGS. 10A to 10E are figures illustrating examples of images after estimation of straight lines and images after specification of vertexes according to Embodiment 2 of the present invention.

Straight line estimation section 31 estimates a plurality of straight lines based on the plurality of edges (e.g., edges 11 to 14) detected in edge detection section 2. More specifically, straight line estimation section 31 uses Hough transform, which is a common parameter estimation technique based on information on a two-dimensional coordinate sequence of edges, and thereby estimates straight line parameters. FIGS. 10A to 10D show examples of the respective estimated straight lines. FIG. 10A is an image of straight line 11' estimated based on edge 11. FIG. 10B is an image of straight line 12' estimated based on edge 12. FIG. 10C is an image of straight line 13' estimated based on edge 13. FIG. 10D is an image of straight line 14' estimated based on edge 14. Thus, straight lines 11' to 14' are lines obtained by extending edge 11 to 14 respectively.

Vertex specification section 32 specifies intersection points between the straight lines estimated in straight line estimation section 31. The intersection points between the straight lines are obtained by solving simultaneous equations derived from an equation expressing each straight line. Note that an intersection point of which straight line with which straight line is obtained is predetermined. FIG. 10E shows examples of the respective specified intersection points. In FIG. 10E, intersection point A between straight line 11' and straight line 12', intersection point B between straight line 12' and straight line 13', intersection point C between straight line 13' and straight line 14' and intersection point D between straight line 14' and straight line 11' are specified respectively. Intersection positions A, B, C and D specified in this way constitute vertexes making up a virtual polygon region. Therefore, intersection points A, B, C and D will be referred to as vertexes A, B, C and D respectively. Note that in the present embodiment, the virtual polygon region generated assumes a square shape as an example.

In this way, straight lines are specified by straight line estimation section 31 and vertexes are specified by vertex specification section 32, and the polygon region surrounded by these straight lines and vertexes is generated as a virtual polygon region. Note that a specific example of the range in which this virtual polygon region is generated will be described later using FIG. 14.

Returning to FIG. 4, camera parameter calculation section 4 will be described.

Camera parameter calculation section 4 calculates camera parameters (e.g., roll angle, pitch angle and height of camera 20) based on the feature values in the image of the virtual polygon region generated in polygon generation section 3 and the feature values of the virtual polygon region in the real space. The definitions of the "feature value in an image" and the "feature value in a space" and examples of "calculation of camera parameters" referred to here are the same as described in Embodiment 1.

Figure 11:
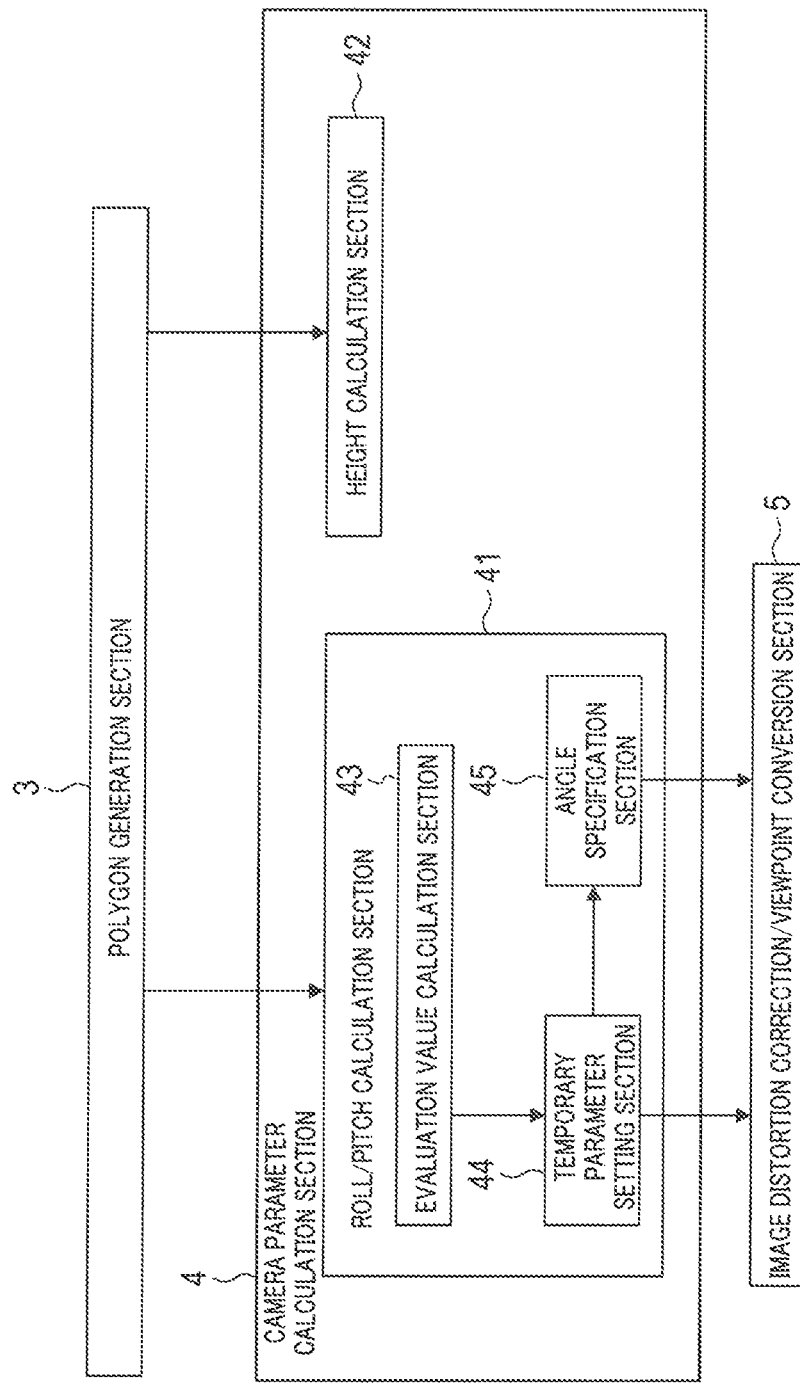
FIG. 11 is a block diagram illustrating a configuration example of a camera parameter calculation section according to Embodiment 2 of the present invention.

As shown in FIG. 11, camera parameter calculation section 4 includes roll/pitch calculation section 41 that calculates a roll angle and a pitch angle, and height calculation section 42 that calculates a height.

As shown in FIG. 11, roll/pitch calculation section 41 includes evaluation value calculation section 43, temporary parameter setting section 44 and angle specification section 45.

Evaluation value calculation section 43 calculates an evaluation value indicating the degree of shape matching between the polygon in an image and the polygon in a real space based on information indicating the lengths of four sides of the virtual polygon region generated in polygon generation section 3. When the virtual polygon region is a square, the evaluation value is a value indicating square-likeness of the polygon in the image. The present embodiment assumes that standard deviations of lengths of the four sides of the polygon are used as evaluation values. More specifically, when the lengths of the four sides of the polygon are assumed to be L1 to L4 and an average value of the lengths of the four sides is assumed to be $L_m$, evaluation value E is calculated from following equation 1.

(Equation 1)

$$E = \sqrt{1/3 \Sigma_{k=1}^{4}(L_k - L_m)^2} \quad [1]$$

Figure 12B:
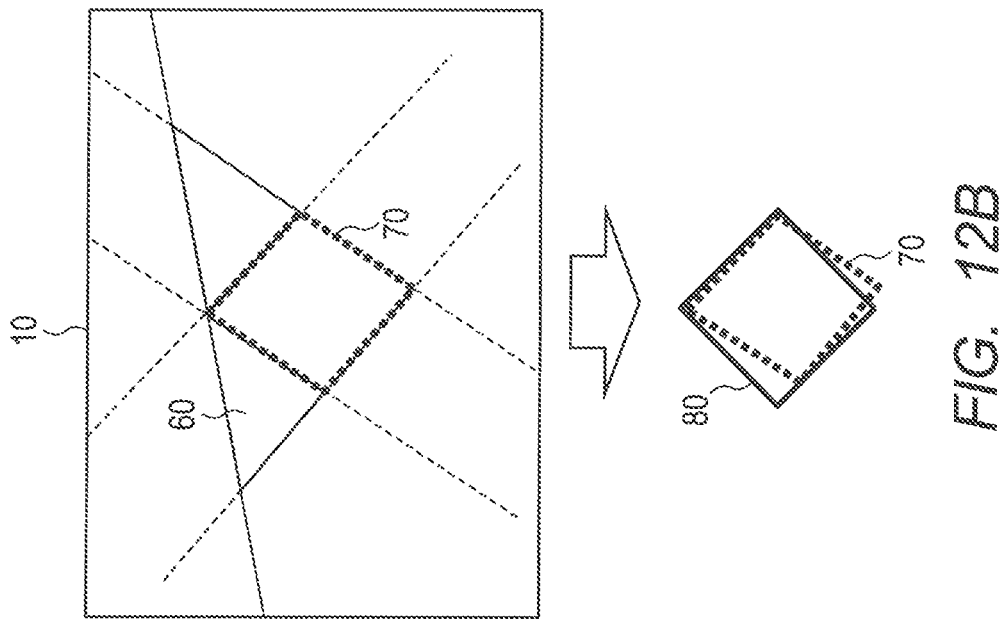
FIGS. 12A and 12B are explanatory diagrams illustrating square-likeness according to Embodiment 2 of the present invention.
Figure 12A:
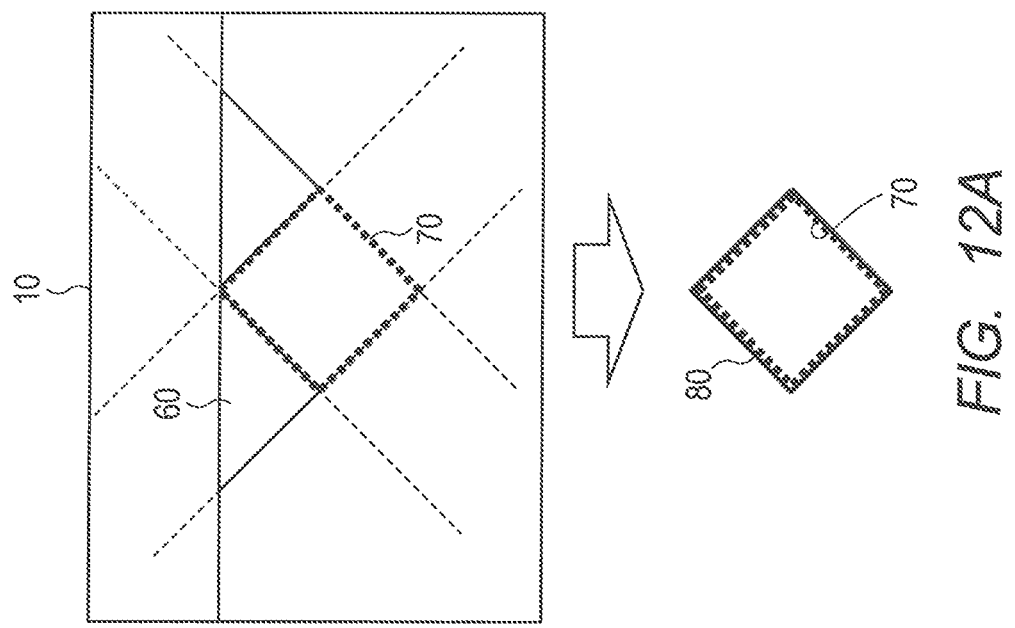

The greater the similarity of the virtual polygon region to a square, the smaller the evaluation value, that is, the value of standard deviation of lengths of the four sides of the polygon becomes. FIGS. 12A and 12B illustrate examples of a difference in square-likeness. When polygon region 70 in the image is compared with accurate square 80 in FIG. 12A and FIG. 12B, FIG. 12A shows the shape more similar to a square and the evaluation value which is the standard deviation of the lengths of the four sides of the polygon in FIG. 12A is also smaller.

Note that although the standard deviation of the lengths of the sides making up a polygon is used above as an evaluation value, a standard deviation of angles at vertices of a polygon may be used or both the lengths of sides and the magnitudes of angles may be used and weights may be assigned to the respective values to determine an evaluation value.

Temporary parameter setting section 44 sets temporary parameters of a roll angle and pitch angle, and outputs the temporary parameters to image distortion correction/viewpoint conversion section 5. After that, image distortion correction/viewpoint conversion section 5 executes distortion correction and viewpoint conversion based on the temporary parameters as described above.

Furthermore, temporary parameter setting section 44 describes a pair of the evaluation value calculated in evaluation value calculation section 43 and the temporary parameter used to calculate the evaluation value in an evaluation value list. Temporary parameter setting section 44 updates the temporary parameter values of the roll angle and pitch angle in image distortion correction/viewpoint conversion section 5. The temporary parameter values may be updated by trying all combinations of predetermined values or temporary parameters of the next roll angle and pitch angle may be set based on tendencies of the evaluation value calculated this time and the evaluation values calculated up to this point. Upon determining that contents of the evaluation value list are sufficient to specify the roll angle and pitch angle, temporary parameter setting section 44 asks angle specification section 45 to perform the processing.

Figures 13A, 13B:
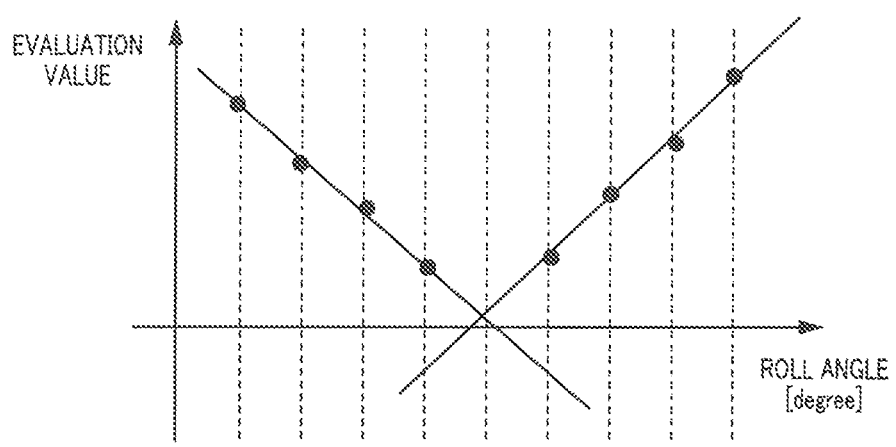
FIGS. 13A and 13B are figures illustrating a processing example of calculations of a roll angle and a pitch angle according to Embodiment 2 of the present invention.

Angle specification section 45 specifies the roll angle and pitch angle based on the evaluation value list stored in temporary parameter setting section 44. As an example of the method of specifying angles, a roll angle (e.g., 10 degrees) and pitch angle (e.g., 80 degrees) corresponding to a case where the evaluation value becomes a minimum (e.g., 0.96) may be specified as solutions as shown in FIG. 13A, for example. Alternatively, when more accurate values need to be specified, a more exact roll angle (e.g., 9.96°) may be specified by fitting a straight line from the relationship between the pitch angle (e.g., 80°) and evaluation value as shown in FIG. 13B, for example.

Angle specification section 45 outputs the roll angle and pitch angle which are the specified camera parameters to image distortion correction/viewpoint conversion section 5 and asks it to perform distortion correction and viewpoint conversion. After that, image distortion correction/viewpoint conversion section 5 performs the distortion correction and viewpoint conversion based on the camera parameters.

Figure 14:
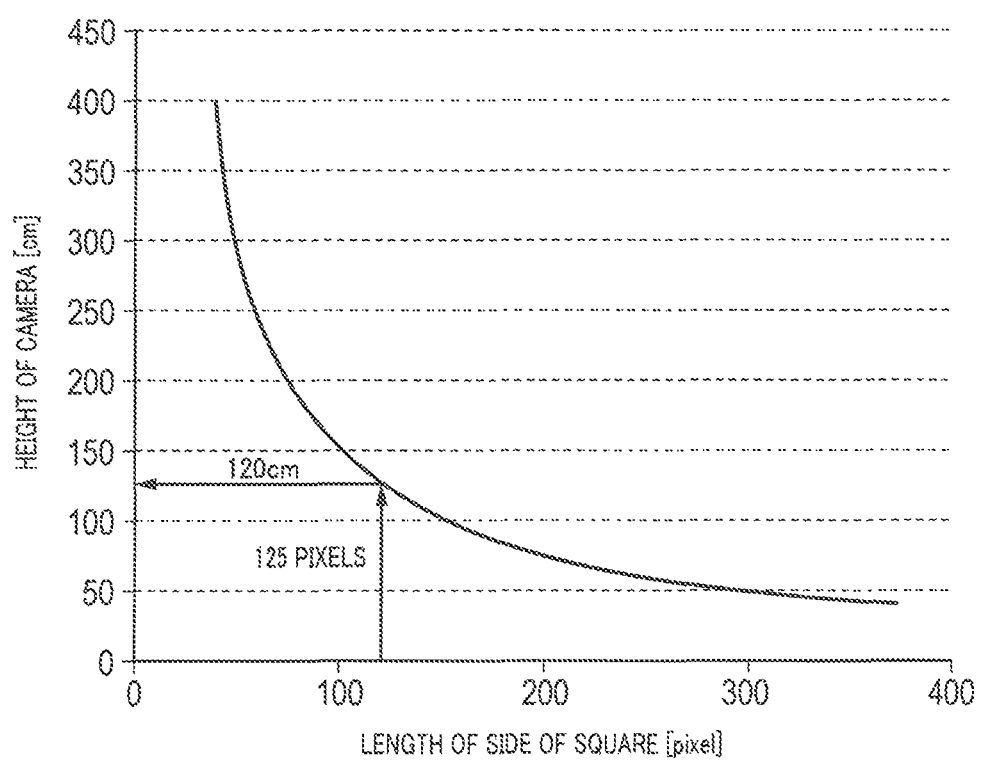
FIG. 14 is a figure illustrating a processing example of calculation of a height according to Embodiment 2 of the present invention.

Height calculation section 42 calculates a height based on the information indicating the lengths of the four sides of the virtual polygon region generated in polygon generation section 3. For example, when the polygon region is a square, for example, height calculation section 42 calculates a typical value of the lengths of the sides of the square from an average value of the lengths of the four sides of the square. Height calculation section 42 inputs the typical values of the lengths of the sides and calculates the corresponding height based on a graph shown in FIG. 14 indicating the relationship between the length of each side and the height. For example, when the length of each side of the square in the camera image has 125 pixels, a height of camera of 120 cm is obtained by looking up the graph in FIG. 14. Note that, suppose that the graph shown in FIG. 14 is stored beforehand, for example, in height calculation section 42.

As described above, camera parameter calculation section 4 calculates the roll angle, pitch angle and height as camera parameters of camera 20.

The effects in the present embodiment will be described below.

First, a relationship between a marker and calibration accuracy will be described. To improve the accuracy of calibration, straight lines making up a polygon need to be estimated accurately. As described above, the accuracy of estimation of straight lines by straight line estimation section 31 depends on a set of candidate points which are candidates of points making up the straight lines. Thus, the wider the range of the camera image over which a set of candidate points are distributed (in other words, the greater the length of the edge), the higher the accuracy of estimation of the straight lines performed based on the set of candidate points becomes.

The related art (e.g., technique in PTL 2) and the present embodiment match in that both use a polygon for calibration and calculate camera parameters based on the polygon.

Figure 15:
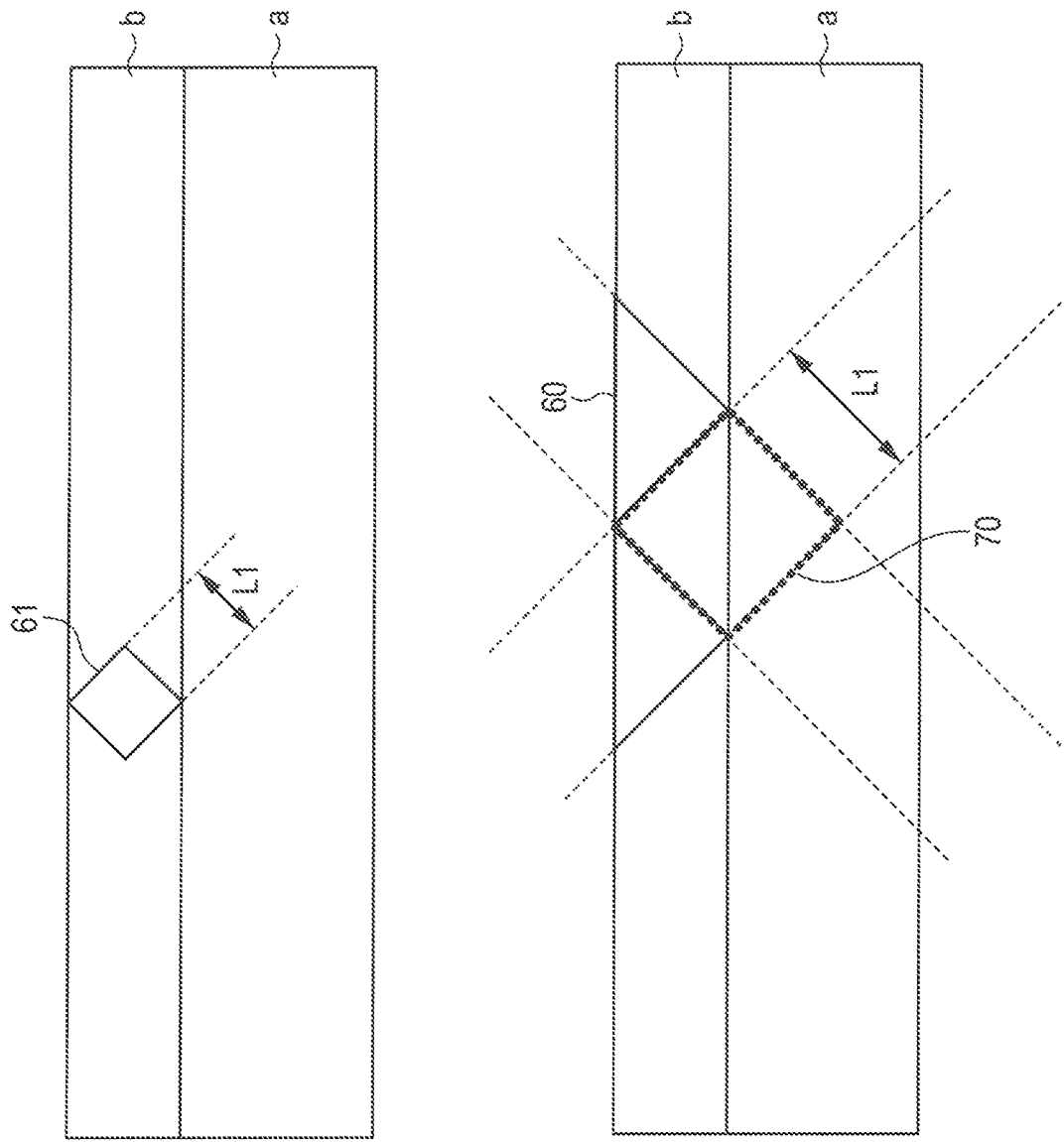

On the other hand, the related art is different from the present embodiment in that while the related art needs to detect a marker itself as a polygon, the present embodiment has no such need. That is, according to the related art, the size and shape of the marker to be set need to be identical to the size and shape detected. Thus, in the related art, for example, when the marker settable range is limited to only region b as shown in FIG. 15A, marker 61 needs to be set so that the polygon (e.g., square) does not stick out of region b. For this reason, the size of marker 61 is also restricted and length L1 of one side of the square also becomes shorter.

In contrast, in the case of the present embodiment, straight lines are estimated based on edges detected from markers and a virtual polygon is generated from straight lines thereof. That is, in the present embodiment, the size and shape of markers to be set need not be identical to the size and shape of markers detected. Thus, by adjusting the shape and setting positions of the markers, it is possible to generate a virtual polygon region that sticks out of the marker settable range. For example, in FIG. 15B, in the same way as in FIG. 15A, even when the marker settable range is limited to only region b, by setting marker 60 having a shape in which two triangles are arranged side by side in region b, it is possible to generate virtual polygon region 70 defined by an extension of each hypotenuse of the two triangles at a position other than region b. Although the shape of virtual polygon region 70 is a square, length L1 of one side thereof is twice length L1 of one side of square marker 61 shown in FIG. 15A. Thus, according to the present embodiment, even when the marker settable range is limited, it is possible to virtually obtain a greater polygon region than the polygon region that can be obtained in the related art and thereby keep the calibration accuracy.

Note that although Embodiments 1 and 2 of the present invention have described an example of detecting edges of markers and estimating straight lines based thereon, feature points of the markers may also be detected and straight lines may be estimated based thereon.

The markers and the virtual polygon region in Embodiments 1 and 2 of the present invention are not limited to those described above, but can be modified in various ways. Hereinafter, the variations will be described.

Figure 16:
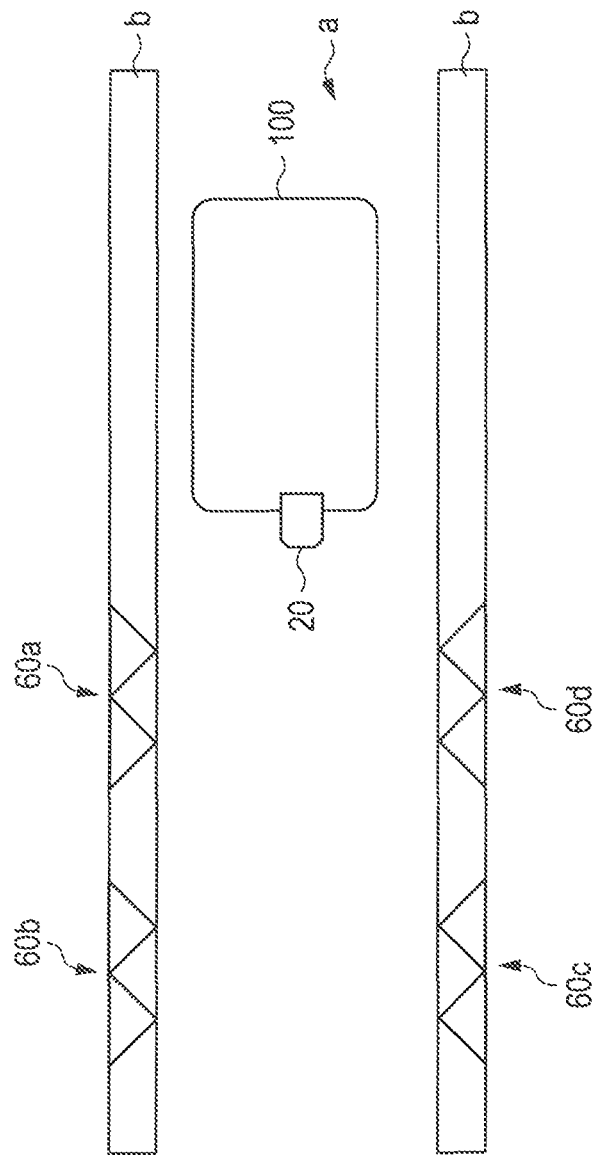
FIG. 16 is a figure illustrating an example of a calibration environment of an image processing apparatus according to Embodiment 3 of the present invention.

An example has been described in above Embodiments 1 and 2 in which marker 60 is set in only one region b (marker settable range) located on one side of vehicle 100 as shown in FIG. 2, but the number of set markers and the setting position are not limited to them. For example, as shown in FIG. 16, markers 60a and 60b, and markers 60c and 60d may be set in region b on one side and the other side of vehicle 100. Note that markers 60a, 60b, 60c and 60d are the same as marker 60 shown in FIG. 2 and FIG. 15B.

Virtual polygon region 70 generated in the case of the marker setting shown in FIG. 16 is defined by two straight lines estimated based on marker 60a and marker 60c, and two straight lines estimated based on marker 60b and marker 60d, and placed in region a which is outside the marker settable range. Virtual polygon region 70 is a square.

Figure 17:
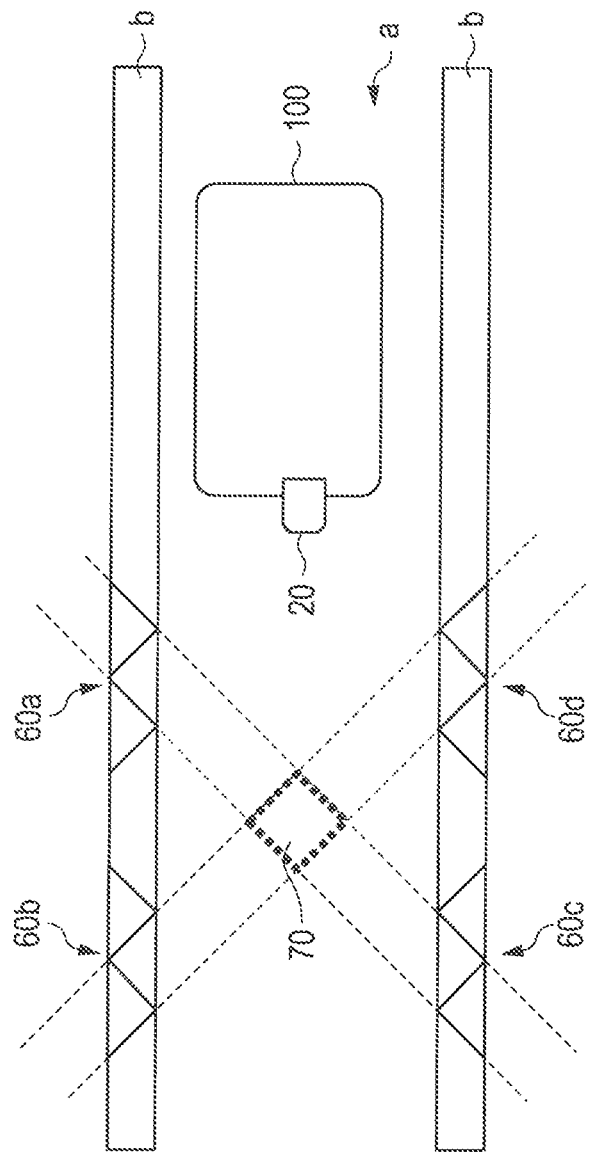
FIG. 17 is a figure illustrating an example of a virtual polygon generation position according to Embodiment 3 of the present invention.

In the examples shown in FIG. 16 and FIG. 17, the same straight line is estimated using two markers (e.g., marker 60a and marker 60c) set at separate positions, and therefore the accuracy of estimating straight lines is improved compared to the cases in FIG. 2 and FIG. 15B. As a result, the accuracy of calibration also improves. Note that regarding the two markers used to estimate the same straight line, inclinations of edges detected from the markers need to be the same.

Figure 18:
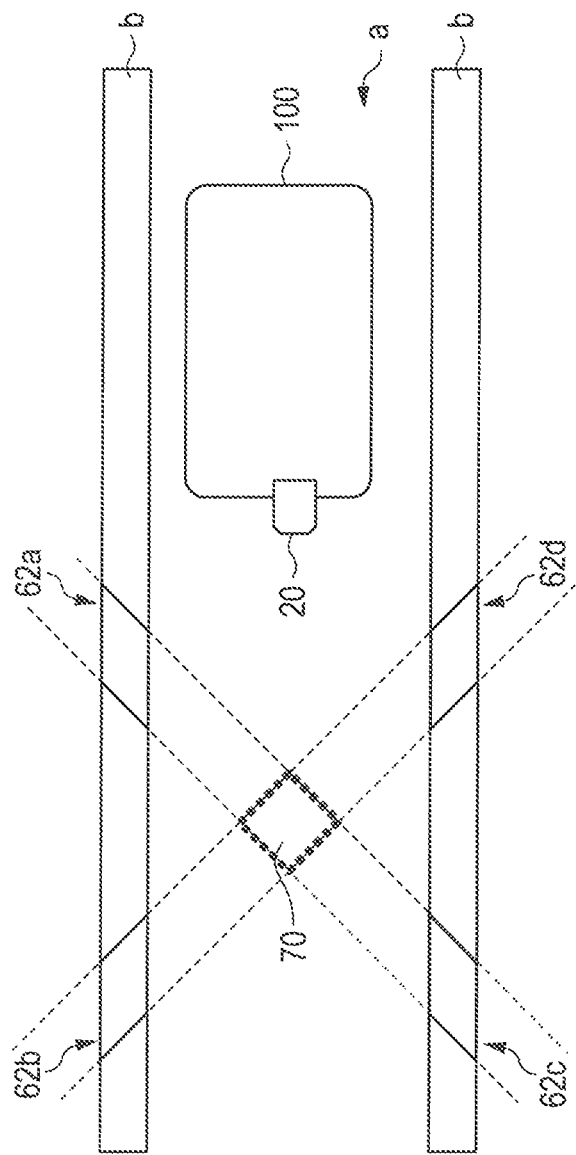
FIG. 18 is a figure illustrating another example of a virtual polygon generation position according to Embodiment 3 of the present invention.

FIG. 18 is a figure illustrating a case where parallelogram markers 62a to 62d are set. In FIG. 18, markers 62a and 62b are set in one region b located on one side of vehicle 100 and markers 62c and 62d are set on other region b. In this case, as in the case of FIG. 17, two straight lines are estimated by marker 62a and marker 62c, and two straight lines are estimated by marker 62b and marker 62d. Virtual polygon region 70 is then generated by the estimated straight lines in region a, which is outside the marker settable range. Virtual polygon region 70 is a square.

When parallelogram markers 62a to 62d shown in FIG. 18 are set, it is possible to reduce the influence of displacement in a positional relationship between the triangles compared to the case with marker 60 where the triangles are arranged side by side, and the accuracy of calibration further improves.

FIG. 19A is a figure illustrating a case where rectilinear (elongated parallelogram) markers 63a to 63j are provided. In FIG. 19A, markers 63a to 63e are set in one region b on one side of vehicle 100 and markers 63f to 63j are set in other region b. In this case, one straight line is estimated by marker 63a and marker 63h, and one straight line is estimated by marker 63b and marker 63j. Furthermore, one straight line is estimated by marker 63c and marker 63f, one straight line is estimated by marker 63d and marker 63i, and one straight line is estimated by marker 63e and marker 63g. Virtual polygon region 71 is then generated by the estimated straight lines in region a, which is outside the marker settable range. Virtual polygon region 71 is a pentagon.

In the case of FIG. 19A, markers may be colored to make it clear which marker edges are to be connected to each other. For example, markers are used in colors differing from one set of markers to another for connecting edges, for example, marker 63a and marker 63h being colored in yellow, and marker 63b and marker 63j being colored in blue. It is thereby possible to specify sides of a virtual polygon, too. For example, it is possible to specify side L11 included in the straight line estimated by markers 63a and 63h, and side L12 included in the straight line estimated by markers 63b and 63j.

When the setting position of the vehicle is always the same, the marker position in the camera image is always the same. For this reason, the virtual polygon generated by straight lines specified based on marker edges in the camera image is also always located at the same position. However, when the vehicle is set at a large angle relative to the virtual polygon, the virtual polygon in the camera image rotates significantly. When the degree of inclination of the vehicle setting is unclear, the association between sides of the virtual polygon and sides of the polygon in the real space is also unclear. As described above, use of markers in colors which differ from one set of markers to another for connecting edges facilitates association between sides of the virtual polygon and sides of the polygon in the real space.

When a pentagon is generated as the virtual polygon region, camera parameter calculation section 4 uses the length of one specific side of the virtual polygon in the image and the length in the real space or a ratio in lengths of sides, and can thereby calculate camera parameters through a technique of calculating the evaluation values described in Embodiment 2.

FIG. 19B is a figure illustrating a case where trapezoidal markers 64a to 64f are set instead of rectilinear (elongated parallelogram) markers 63a to 63j to form the same pentagon as that in FIG. 19A. In FIG. 19B, for example, marker 64a is a trapezoid that can detect the same edges as those of marker 63a and marker 63b shown in FIG. 19A. Two edges detected from marker 64a are connected to one edge detected from marker 64e and one edge detected from marker 64f. Two straight lines L11 and L12 are estimated in this way. Other straight lines are also estimated as with FIG. 19A. A pentagon is generated by the straight lines as virtual polygon region 71 and placed in region a, which is outside the marker settable range.

Figure 20:
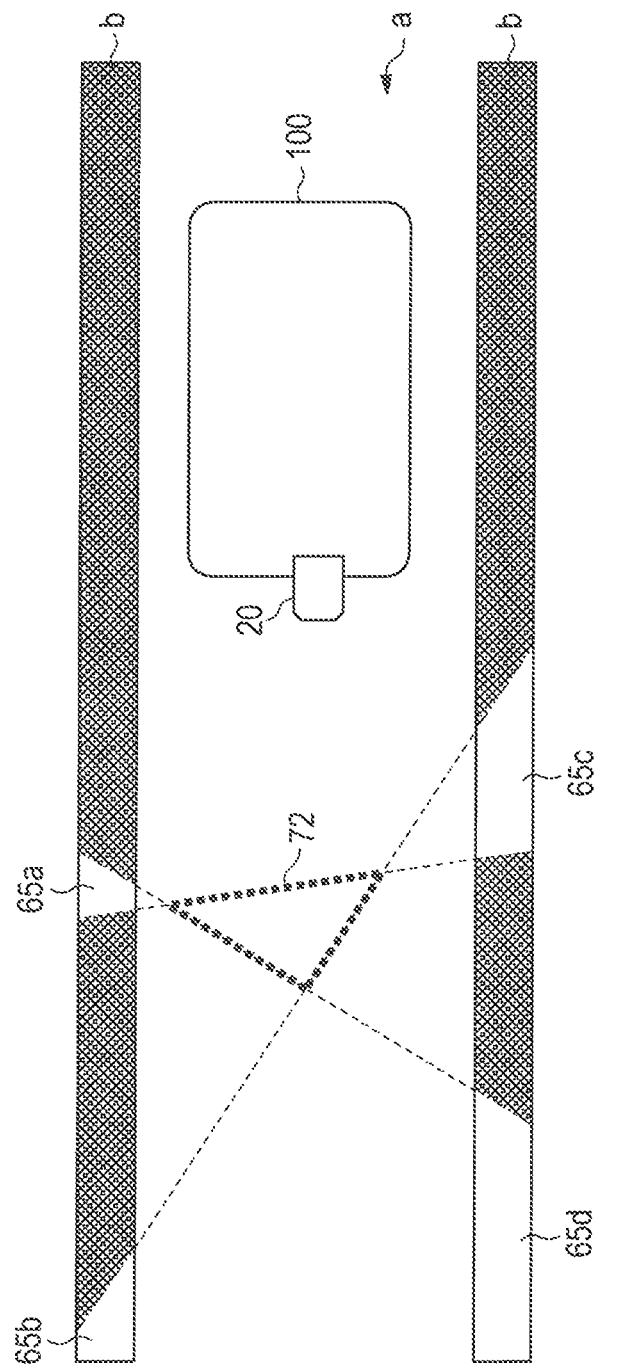
FIG. 20 is a figure illustrating other examples of markers and a virtual polygon according to each embodiment of the present invention.

As with FIG. 19B, FIG. 20 is a figure illustrating a case where trapezoidal markers 65a to 65d are set. In FIG. 20, a plurality of straight lines are estimated based on edges of trapezoidal markers 65a to 65d as with FIG. 19, whereas virtual polygon region 72 formed in region a is a triangle.

FIG. 21A is a figure illustrating a case where circular markers 66a to 66h are set. In this example, straight line estimation section 31 specifies straight lines by connecting centers of gravity of two detected markers in a camera image. For example, one straight line is estimated by marker 66a and marker 66g, and one straight line is estimated by marker 66b and marker 66h. Furthermore, one straight line is estimated by marker 66c and marker 66e, and one straight line is estimated by marker 66d and marker 66f. Virtual polygon region 70 is generated by the estimated straight lines in region a, which is outside the marker settable range. Virtual polygon region 70 is a square.

FIG. 21B is a figure illustrating a case where parallelogram markers 67a, 67d and 67e, and trapezoidal markers 67b, 67c and 67f are set. In this case, polygon generation section 3 extracts specific points c2 on sides in addition to vertexes c1 of a virtual polygon region. For example, polygon generation section 3 estimates straight lines based on edges detected by edge detection section 2 and extracts intersection points of the straight lines, that is, vertexes c1 and points c2. Camera parameter calculation section 4 calculates camera parameters based on positions of vertexes c1 and points c2 in the camera image and positions in the real space.

Note that although an example has been described in above FIG. 17 to FIG. 21 in which the respective markers are set in both regions b on both sides of vehicle 100, the markers may also be set in only one region b as with FIG. 2B and FIG. 15B.

Although Embodiments 1 and 2 of the present invention, and variations thereof have been described so far, the present invention is not limited to the above description, but can be modified without departing from the spirit and scope of the present invention.

The disclosure of Japanese Patent Application No. 2013-164965, filed on Aug. 8, 2013, including the specification, drawings and abstract, is incorporated herein by reference in its entirety.

INDUSTRIAL APPLICABILITY

The present invention is useful for techniques of calculating camera parameters (e.g., an apparatus, system, method and program or the like).

REFERENCE SIGNS LIST

1 Image acquiring section
2 Edge detection section

3 Polygon generation section
4 Camera parameter calculation section
5 Image distortion correction/viewpoint conversion section
10 Image processing apparatus
20 Camera
21 Marker region specification section
22 Filtering section
23 Candidate point extraction section
31 Straight line estimation section
32 Vertex specification section
41 Roll/pitch calculation section
42 Height calculation section
43 Evaluation value calculation section
44 Temporary parameter setting section
45 Angle specification section
100 Vehicle

What is claimed is:

1. A vehicle-mounted image processing apparatus comprising a processor configured to:
acquire a captured image of one or more markers set in a marker settable range;
detect:
a plurality of edges of the one or more markers in the image or
a plurality of feature points of the one or more markers in the image,
each of the plurality of feature points indicating an end point of one of the one or more markers or a center of gravity of one of the one or more markers;
estimate a plurality of straight lines based on the plurality of edges or the plurality of feature points and
generates a virtual polygon region surrounded by the plurality of straight lines and a plurality of vertexes each being an intersection point of the plurality of straight lines; and
calculate a camera parameter based on a feature value of the virtual polygon region in the image and a feature value of the virtual polygon region in a real space, wherein:
the feature value of the virtual polygon region in the image is information on a shape of the virtual polygon region in the image,
the feature value of the virtual polygon region in the real space is information on a shape of the virtual polygon region in the real space, and
at least one of the plurality of vertexes is a virtual vertex which is included in a region outside the marker settable range and is different from the edge or the feature point in the image.

2. The image processing apparatus according to claim 1, wherein the plurality of straight lines are estimated based on the plurality of edges or the plurality of feature points of a first marker and the plurality of edges or the plurality of feature points of a second marker, and
the first marker and the second marker are located separately in the image.

3. The image processing apparatus according to claim 1, wherein the processor is further configured to set the feature value of the virtual polygon region in the real space as a length of each side or an angle at each vertex making up the virtual polygon region.

4. An image processing method, performed by a processor of a vehicle-mounted image processing apparatus, the image processing method comprising steps of:
acquiring a captured image of one or more markers set in a marker settable range;
detecting a plurality of edges or a plurality of feature points of the one or more markers in the image, each of the plurality of feature points indicating an end point of one of the one or more markers or a center of gravity of one of the one or more markers;
estimating a plurality of straight lines based on the plurality of edges or the plurality of feature points;
generating a virtual polygon region surrounded by the plurality of straight lines and a plurality of vertexes each being an intersection point of the plurality of straight lines; and
calculating a camera parameter based on a feature value of the virtual polygon region in the image and a feature value of the virtual polygon region in a real space, wherein:
the feature value of the virtual polygon region in the image is information on a shape of the virtual polygon region in the image,
the feature value of the virtual polygon region in the real space is information on a shape of the virtual polygon region in the real space, and
at least one of the plurality of vertexes is a virtual vertex which is included in a region outside the marker settable range and is different from the edge or the feature point in the image.

5. The image processing method according to claim 4, wherein the plurality of straight lines are estimated based on the plurality of edges or the plurality of feature points of a first marker and the plurality of edges or the plurality of feature points of a second marker, and
the first marker and the second marker are located separately in the image.

6. The image processing method according to claim 4, wherein the feature value of the virtual polygon region in the real space is set as a length of each side or an angle at each vertex making up the virtual polygon region.

* * * * *